(12) United States Patent
Harrison et al.

(10) Patent No.: US 6,413,302 B1
(45) Date of Patent: Jul. 2, 2002

(54) AIR TREATMENT DEVICE

(75) Inventors: Neale Harrison, Burton on Trent; Gay Cornelius, Cottingham; Hamilton Scanlon, Huntingdon; Allen Pearson, Cambridge, all of (GB)

(73) Assignee: Reckitt Benckiser (UK) Limited, Slough (GB)

( * ) Notice: Subject to any disclaimer, the term of this patent is extended or adjusted under 35 U.S.C. 154(b) by 0 days.

(21) Appl. No.: 09/331,030

(22) PCT Filed: Dec. 23, 1997

(86) PCT No.: PCT/GB97/03538

§ 371 (c)(1),
(2), (4) Date: Jul. 23, 1999

(87) PCT Pub. No.: WO98/29695

PCT Pub. Date: Jul. 9, 1998

(30) Foreign Application Priority Data

Dec. 27, 1996 (GB) .............................................. 9626950

(51) Int. Cl.[7] .................................................. B03C 3/36
(52) U.S. Cl. ................................. 96/63; 55/471; 96/66; 96/147; 96/151; 96/222; 261/DIG. 88
(58) Field of Search ........................ 55/418, 471; 96/97, 96/63, 66, 147, 151; 261/24, 26, 30, DIG. 17, DIG. 88, DIG. 89

(56) References Cited

U.S. PATENT DOCUMENTS

| | | | | |
|---|---|---|---|---|
| 3,860,404 A | | 1/1975 | Jochimski | 96/147 |
| 3,923,934 A | * | 12/1975 | Watkins | 261/24 |
| 4,059,422 A | * | 11/1977 | Steiner | 55/418 X |
| 4,219,531 A | * | 8/1980 | Wisniewski | 261/DIG. 88 |
| 4,301,095 A | * | 11/1981 | Mettler et al. | 261/30 |
| 4,629,482 A | * | 12/1986 | Davis | 55/471 X |
| 4,666,638 A | * | 5/1987 | Baker et al. | 261/26 |
| 4,694,142 A | | 9/1987 | Glucksman | 392/360 |
| 4,711,161 A | | 12/1987 | Swin et al. | 454/230 |
| 4,795,883 A | * | 1/1989 | Glucksman et al. | 261/DIG. 89 |
| 4,804,821 A | * | 2/1989 | Glucksman | 261/DIG. 89 |
| 4,830,791 A | * | 5/1989 | Muderlak et al. | 261/DIG. 88 |
| 5,192,342 A | * | 3/1993 | Baron et al. | 261/DIG. 88 |
| 5,220,636 A | * | 6/1993 | Chang | 261/DIG. 88 |
| 5,601,636 A | * | 2/1997 | Glucksman | 55/471 X |
| 5,741,352 A | * | 4/1998 | Ford et al. | 96/97 X |

FOREIGN PATENT DOCUMENTS

EP 0 693 659 A 1/1996

OTHER PUBLICATIONS

Patent Abstracts of Japan, vol. 007, No. 289 (C–202), Dec. 23, 1993; and JP 58 166948 A (Nihon Muki Seni Kogyo KK), Oct. 3, 1983.
Copy of PCT International Search Report for PCT/GB97/03538 dated Mar. 30, 1998.

* cited by examiner

Primary Examiner—Richard L. Chiesa
(74) Attorney, Agent, or Firm—Fish & Richardson P.C.

(57) ABSTRACT

An air treatment device is adapted to be mounted on and directly supported by an electrical socket. A treatment medium, such as a replaceable electrostatic filter or a replaceable absorber/adsorber, is located at the front of the device. A fan draws air through the medium and particles with a particle size above 0.1 μm are removed.

15 Claims, 2 Drawing Sheets

AIR TREATMENT DEVICE

BACKGROUND OF THE INVENTION

This invention relates to a device for treating air, and particularly for removing contaminants such as particulates like dust or pollen, germs, viruses or gaseous components from the air for domestic purposes.

Previous devices of this type have been large and bulky, frequently greater than 30 to 40 cm across.

This is because in order to treat a reasonable throughput of air in a room or office the product of fan speed and fan area has to be fairly large, and if a small fan is used it therefore has to run at a high speed. At higher speeds however fans tend to produce an unacceptable level of noise which makes them unsuitable for domestic or office applications.

Moreover, filters for such applications having a mesh size sufficient to trap particles no greater than 0.1 $\mu$m provide a considerable resistance to the flow of air; hence to provide a sufficient throughput of air to clean the air in a room satisfactorily such air purifiers have traditionally been large, to stand on a desk or even the floor.

A need therefore exists to provide an air treatment device adapted to be plugged directly into and be supported by an electrical socket, in particular, a mains electrical socket.

SUMMARY OF THE INVENTION

According to the invention there is provided an air treatment device adapted to be plugged directly into and supported by a mains electrical socket, the device comprising a treatment medium, a fan adapted to cause air to flow through the treatment medium, an electric motor to drive the fan, a housing, and a plurality of pins attached to the housing and adapted to fit within the socket and to provide electricity to the motor, wherein the fan includes an integral hub adapted to accommodate the motor in the hub to facilitate support of the device by the electrical socket. Most simply the pins themselves, which supply electricity and therefore power to the motor, also provide the support for the device itself.

Alternatively, or in conjunction with the above, the invention provides an air treatment device adapted to be plugged directly into and supported by an electrical socket comprising a treatment medium, a fan adapted to cause air to flow through the treatment medium, a motor to drive the fan, a housing and a plurality of pins attached to the housing adapted to fit within the socket and to supply electricity to the motor wherein the axial thickness of the fan is between 1 and 5 centimeters, preferably between 2 and 4 centimeters.

Alternatively, or in conjunction with the above, the invention provides an air treatment device adapted to be plugged directly into and supported by an electrical socket comprising a treatment medium, a fan adapted to cause air to flow through the treatment medium, a motor to drive the fan, a housing and a plurality of pins attached to the housing adapted to fit within the socket and to supply electricity to the motor wherein the motor is adapted, in use, to rotate the fan at less than 3000 revolutions per minute, preferably between 2000 and 2800 revolutions per minute.

Alternatively, or in conjunction with the above, there is provided an air treatment device adapted to be plugged directly into and supported by an electrical socket comprising a treatment medium, a fan adapted to cause air to flow through the treatment medium, a motor to drive the fan, a housing and at least two, preferably three, pins attached to the housing adapted to fit within the socket and to supply electricity to the motor wherein the device is so dimensioned to be supported solely by the fitting of the pins within the electrical socket.

DETAILED DISCLOSURE

In all of the above, the motor is most conveniently a DC motor, which means that for installation on a normal mains socket transforming and rectifying means also have to be included. Surprisingly, the inventors have found that even with this constraint it is still possible by careful design to construct a treatment device that can support itself in a socket. The transformer and associated rectifier elements can be located above the fan. Local regulations determine the maximum size of articles adapted to be supported from a mains socket and in particular a maximum torque allowed to be exerted on the socket.

The treatment medium is preferably a filter, in particular an electrostatic filter, comprising a fine-mesh sheet. The fabric for such filters is suitably made of polypropylene which is electrostatically charged during manufacture and is available, for example, from 3M. The filter operates by electrostatically attracting small particles passing through it. The filter sheet is advantageously puckered or ribbed, not flat, to increase the effective surface area of the filter for a given size of housing. The ribbing also acts to slow the effective speed of air through the filter, so that the electrostatic filter can still trap particles even with a relatively high volumetric throughput of air. Such a throughput is necessary to provide effective cleaning of air.

Alternatively, for gaseous pollutants the choice of treatment medium will depend on the exact chemical nature of the gas but may include activated charcoal and molecular sieves.

As outlined above and in use, the speed of the fan is preferably less than 3000 rpm, further preferably between 2000 and 2800 rpm. Above 3000 rpm the noise and pitch of the sound of the fan becomes too irritating for use in a domestic or office environment. Below approximately 2000 rpm it is not possible to provide a fan having sufficient throughput and creating a suitable pressure differential. Electrostatic filters require tightly controlled pressure differentials and volumetric throughputs to operate correctly.

In order to achieve a suitable throughput the fan is preferably of the reverse-curve impeller type with at least six, preferably between nine and fifteen blades. The reverse-curve impeller is able to produce a sufficient throughput because it is able to produce a sufficiently high pressure drop across the filter, unlike a conventional fan of the same size. If the number of blades is too small the fan has to be rotated too quickly to provide an adequate throughput of air. Too high a number of blades increases the manufacturing difficulties and reduces the size of the gaps between the blades to an extent that the efficiency is not increased by adding further blades.

The dimensions of the fan are also preferably carefully selected. If the blades of the fan are too close to the housing the amount of noise is greatly increased. However, if the fan is too small then it has to be run at a faster speed for the same throughput of air, which once again increases the noise. Experiments have shown that the outside end of the fan blades should be between 1 mm and 20 mm from the inside of the housing, further preferably between 3 and 8 mm. Typically, the fan will have a diameter of from 1 to 14 cm, preferably 2 to 8 cm.

It will be appreciated that if the fan has an excessive axial thickness (depth) then the housing becomes excessively large and too much torque has to be borne by the mains electrical socket. Accordingly the axial thickness or depth of the fan is also important, although less critical that the diameter in terms of throughput of the fan. Thus, as outlined above, the depth of the fan should be between 1 and 5 cm.

The housing of the device is preferably between 5 and 15 cm across a face of the device opposed to the face of the device adjacent the mains socket in use. The distance between the opposed faces, i.e. the depth of the device, is between 1 and 15 cm, preferably between 2 and 11 cm, most preferably between 3 and 8 cm. A larger device could not be supported by a mains electrical socket and in dual-socket arrangements would interfere with the neighbouring socket, and a smaller device would not clean the air effectively.

The motor can be of conventional construction but is preferably designed to run continuously for an extended period.

In addition to filtering air by drawing it through the treatment medium, for example, the filter, the device may be adapted to treat air by emitting components into the air. These components may include fragrances, odour neutralising agents, aromatherapy oils, insect repellents or insecticides. Such components may be included on or in the treatment medium or they be emitted into the air in another manner from or by the device.

BRIEF DESCRIPTION OF THE DRAWINGS

For a better understanding of the invention, a specific embodiment will now be described with reference to the accompanying drawings, in which.

DETAILED EXAMPLE

Figure 1:
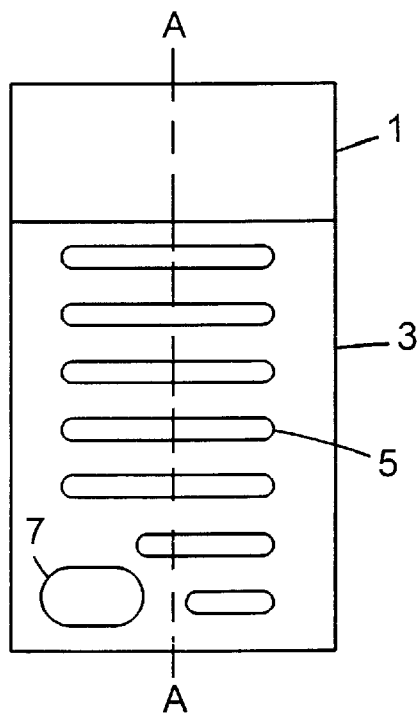
FIG. 1 shows a front view of the air treatment device according to an embodiment of the invention.

FIG. 1 shows the front view of an air treatment device representing an embodiment of the invention. A housing 1 having a width of approximately 8 cm and a height of approximately 14 cm is provided. The housing is made from ABS plastic. On the front of the housing 1 is provided a slideable front cover 3 having air intake slots 5 and view hole 7. The air intake slots permit ingress of air into the device. A treatment medium, in this embodiment a filter 33 (FIG. 2) is mounted behind the cover. The view hole 7 allows inspection of the filter, which cannot easily be seen through the air intake slots 5, at least when the device is in position in a socket near the floor.

Figure 2:
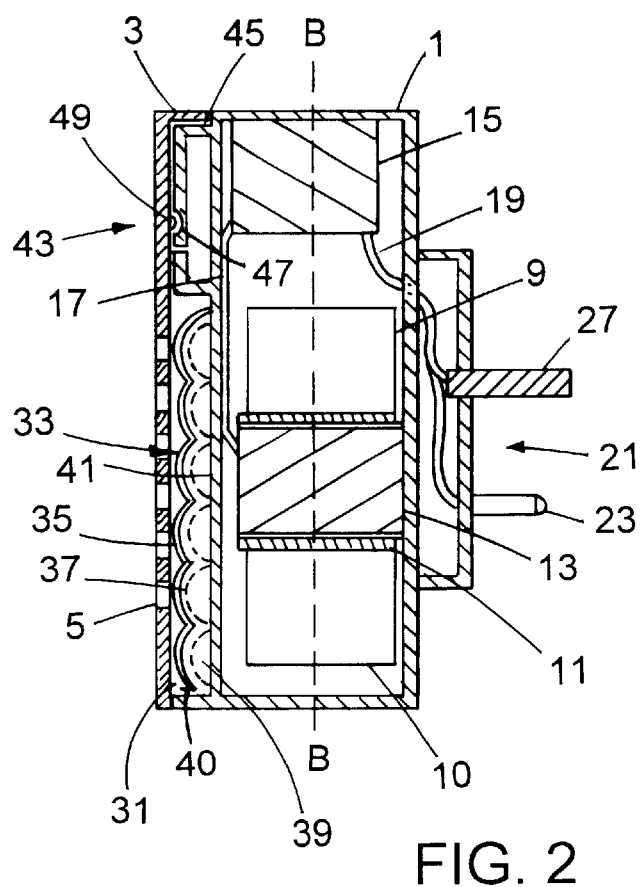
FIG. 2 shows a section along line A—A of the air treatment device of FIG. 1.

Referring to FIG. 2, a fan 9 is provided in the housing 1. The fan 9 has blades 10 and a hub 11. An electric motor 13 is provided inside the hub 11 of the fan 9 and drives it directly.

The motor 13 is directly connected by means of wires 17 to a standard transformer device 15, which is in turn connected by wires 19 to the mains plug 21 having a live pin 23, a neutral pin 25 and an earth (ground) pin 27. The arrangement of the pins and the shape of the rear section of the housing is changed according to the local design of mains sockets. For example, in Germany a design with two rounded pins in a cylindrical plug would be used. The device is double insulated, and so the earth pin 27 need only be provided where required, for example in the UK.

A filter-holding compartment 31 is located in front of the fan 9 and communicates with it by means of a hole or holes 41. A filter 33 is provided in the compartment 31. In order to increase the effective surface area of the filter in a small housing the filter 33 is not flat. The filter is made from a piece of filter material 35 mounted on a ribbed matrix 37, the ribbed matrix 37 being made from stiff plastic mesh with a hole size of several millimeters. For stability a back matrix 39 is provided being made of a flat sheet of the same material as the ribbed matrix 37. The ribbed matrix 37 is fixed to the back matrix 39 to provide a stiff support for the filter. A tab 40 is provided at the bottom of the filter to facilitate its removal.

The filter material 35 is made of an electrostatic filter medium such as that sold by 3M. The electrostatic filter is capable of trapping particles with a particle size as low as 0.1 μm even though the mesh size is much greater. The filter material achieves this by being made of polypropylene which is charged with static electricity during manufacture and which keeps that charge. Any small particle passing through the mesh of the filter therefore develops a dipole moment and is attracted to the mesh by the electrostatic charge and sticks to the mesh. Further particles can then be collected by the same part of the mesh, the filter only losing efficiency when so many particles have been trapped that air flow through the mesh is restricted by the reduced size of the holes of the mesh.

Figure 3:
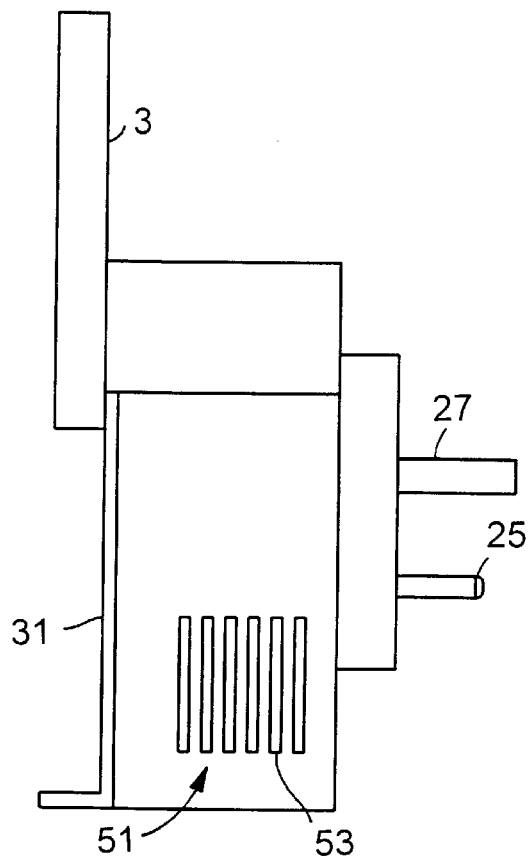
FIG. 3 shows the air treatment device in a side view with the front cover open and the air filter removed.

The front cover 3 is slidable between the closed position shown in FIG. 2 and the open position shown in FIG. 3. In the open position of the cover the filter can be removed by pulling the tab 40. A catch 43 is provided to keep the front cover in the closed position. The catch 43 can also be adapted to retain the front cover in its open position. In this embodiment, the catch 43 comprises a piece of flexible plastic 45 with a small indentation 47 on one end adapted to engage with a protrusion 49 on the inside of the front cover.

Figure 4:
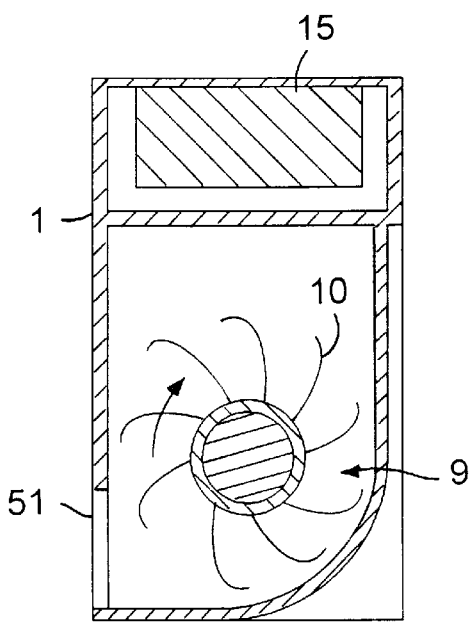
FIG. 4 shows a section along line B—B of FIG. 2, looking in the opposite direction to the front view of FIG. 1.

FIG. 4 shows a rear view of the fan in section. The arrow indicates the direction of motion of the fan 9 and shows the reverse curve blades 10 which curve in the direction opposite to the direction of motion of the fan. At the side, an opening 51 is provided from which the filtered air emerges. To protect the user's fingers, and the fan blade 10, the outlet 51 can be formed to have several slits 53 (FIG. 3).

The fan in this embodiment has nine blades. The greater the number of blades the lower the rotational velocity of the fan has to be to produce an effective throughput of air. A fan with twelve blades would also be effective.

The motor is arranged to run off a 6 volt DC supply provided by the transformer 15; the voltage has to be chosen carefully to give the desired operating speed.

The fan, in this embodiment, has an axial thickness (depth) of approximately 3 cm. This provides a sufficient throughput of air with a low fan rotational velocity, but is not so great that the housing becomes too thick to be held reliably in the socket.

The housing is approximately 80 mm across internally. The fan is approximately 68 mm across. The gap between the ends of the fan blades and the housing is thus not so small that excessive noise is produced, and on the other hand the fan is not so small that it must be run at a high speed to produce effective cleaning.

In use, the motor 13 drives the fan at approximately 2500 rpm. This creates a suitable low-pressure area behind the filter which draws air in through the air intake slots 5 and then through the filter. The effective speed of the air, the face velocity, through the filter has to be precisely controlled when an electrostatic filter is used. If the face velocity is too fast, particles do not have time to be attracted to the mesh of the filter. On the other hand, if the air speed is too low, the device will not be effective in cleaning the air of even a small room.

The fan can be left plugged into an electric socket and run continuously. Over the course of several days or weeks the filter will gradually collect more and more particles, and start to clog. When new, the filter is brilliant white. With use, it becomes a darker and darker shade of grey. The user can see that the filter has become too dirty by looking through the view hole 7, and can thus change the filter when necessary.

In alternative embodiments the treatment medium can be an absorber or adsorber of gaseous materials instead of a filter. The absorber or adsorber can be activated charcoal or calcium chloride. Such treatment media can remove malodorous compounds from the domestic environment.

The treatment medium may also be adapted to absorb car exhaust gases, such as ozone, oxides of nitrogen or sulphur, airborne bacteria, or viruses. The device can also be adapted to emit components into the air, in addition to treating the air.

What is claimed is:

1. An air treatment device adapted and dimensioned to be plugged directly into an electrical mains socket, which comprises
    a housing dimensioned to be between 5 cm and 15 cm across a face of the device opposed to the face of the device intended to be adjacent the socket, said housing containing:
        an air treatment medium,
        a reverse-curve impeller fan adapted to cause air to flow through the treatment medium, said fan having from 6 to 12 blades and an axial thickness between 1 cm and 5 cm, whose radially outer ends are spaced away from the housing so as to provide a clearance of from 1 mm to 20 mm,
        a motor to drive the fan at less than 3,000 revolutions per minute, and
        means for transforming alternating current from the mains socket to direct current for operating the motor,
    and a plurality of pins projecting outwardly from the housing and adapted to fit within the socket to supply electricity to the motor,
wherein the fan includes an integral hub adapted to accommodate the motor within the hub and to facilitate support of the device in the electrical socket, and
wherein the device is supported solely by the fitting of the pins within the electrical socket.

2. An air treatment device according to claim 1 in which the axial thickness of the fan is between 2 cm and 4 cm.

3. An air treatment device according to claim 1 wherein the motor is adapted to rotate the fan at between 2000 and 2800 revolutions per minute.

4. An air treatment device according to claim 1 which comprises three pins.

5. An air treatment device according to claim 1 wherein the air treatment medium is removable.

6. An air treatment device according to claim 1 wherein the air treatment medium is an electrostatic filter.

7. An air treatment device according to claim 6 wherein the electrostatic filter has a ribbed shape in order to increase its effective surface area without increasing its linear size.

8. An air treatment device according to claim 1 wherein the air treatment medium is an absorber or adsorber of gaseous material.

9. An air treatment device according to claim 8 wherein the air treatment medium is activated charcoal or a molecular sieve.

10. An air treatment device according to claim 1 wherein the fan has 8 or 9 blades.

11. An air treatment device according to claim 1 wherein the radially outer ends of said blades are spaced away from said housing so as to provide a clearance of between 3 mm and 8 mm.

12. An air treatment device according to claim 1 comprising, means for transforming alternating current from the mains socket to 6-volt direct current for operating the motor.

13. An air treatment device adapted and dimensioned to be plugged directly into an electrical mains socket which comprises:
    a housing dimensioned to be between 5 cm and 15 cm across a face of the device opposed to the face of the device intended to be adjacent the socket, said housing containing:
        an air treatment medium comprising a ribbed-shape electrostatic filter,
        a fan having an axial thickness between 1 cm and 5 cm and having from 6 to 12 reverse-curve impeller blades, whose radially outer ends are spaced away from the housing so as to provide a clearance of from 1 mm to 20 mm,
        a motor adapted to rotate the fan at between 2000 and 3000 revolutions per minute, and
        means for transforming alternating current from the mains to 6-volt direct current for operating the motor,
and two or three pins attached to and projecting outwardly from said housing and adapted to fit within the socket and supply electricity to the transforming means,
wherein the fan includes an integral hub adapted to accommodate the motor within the hub and to facilitate support of the device in the electrical socket, and wherein the device is supported solely by the fitting of the pins within the electrical socket.

14. An air treatment device according to claim 13 in which the electrostatic filter is removable.

15. An air treatment device adapted and dimensioned to be plugged directly into an electrical mains socket which comprises:
    a housing dimensioned to be between 5 cm and 15 cm across a face of the device opposed to the face of the device intended to be adjacent the socket, said housing containing:
        an air treatment medium comprising an absorber or adsorber for gaseous material,
        a fan having an axial thickness between 1 cm and 5 cm and having from 6 to 12 reverse-curve impeller blades whose radially outer ends are spaced away from the housing so as to provide a clearance of from 1 mm to 20 mm,
        a motor adapted to rotate the fan at between 2000 and 3000 revolutions per minute, and
        means for transforming alternating current from the mains to 6-volt direct current for operating the motor,
two or three pins attached to and projecting outwardly from said housing and adapted to fit within the socket and supply electricity to the transforming means,
wherein the fan includes an integral hub adapted to accommodate the motor within the hub and to facilitate support of the device in the electrical socket, and wherein the device is supported solely by the fitting of the pins within the electrical socket.

* * * * *